United States Patent [19]
Schimmeyer

[11] 4,062,564
[45] Dec. 13, 1977

[54] COLLAPSIBLE GOLF CART

[76] Inventor: Werner K. Schimmeyer, 4889 Arboretum Drive, Los Altos, Calif. 94022

[21] Appl. No.: 745,100

[22] Filed: Nov. 26, 1976

[51] Int. Cl.² .................................................. B62B 1/20
[52] U.S. Cl. ................................. 280/652; 280/DIG. 6
[58] Field of Search ...................... 280/652, 655, 47.26, 280/DIG. 6

[56]  References Cited
U.S. PATENT DOCUMENTS

| | | | |
|---|---|---|---|
| 2,556,814 | 6/1951 | Love | 280/DIG. 6 |
| 3,784,138 | 1/1974 | Herling et al. | 280/47.26 |
| 3,985,373 | 10/1976 | Widegren | 280/652 |

FOREIGN PATENT DOCUMENTS 1,140,295  1/1956  France ........................... 280/DIG. 6

Primary Examiner—Robert R. Song
Attorney, Agent, or Firm—Boone, Schatzel, Hamrick & Knudsen

[57] ABSTRACT

A collapsible golf cart apparatus for carrying a golf bag and including a base, a pair of removable wheels mounted on axles that are retractable into the base, a compartment in the base for storing the wheels, a cover for the storage compartment, a bracket to support the cover in one position in place over the storage compartment and in a different position to provide a seat, and a folding handle mechanism.

6 Claims, 7 Drawing Figures

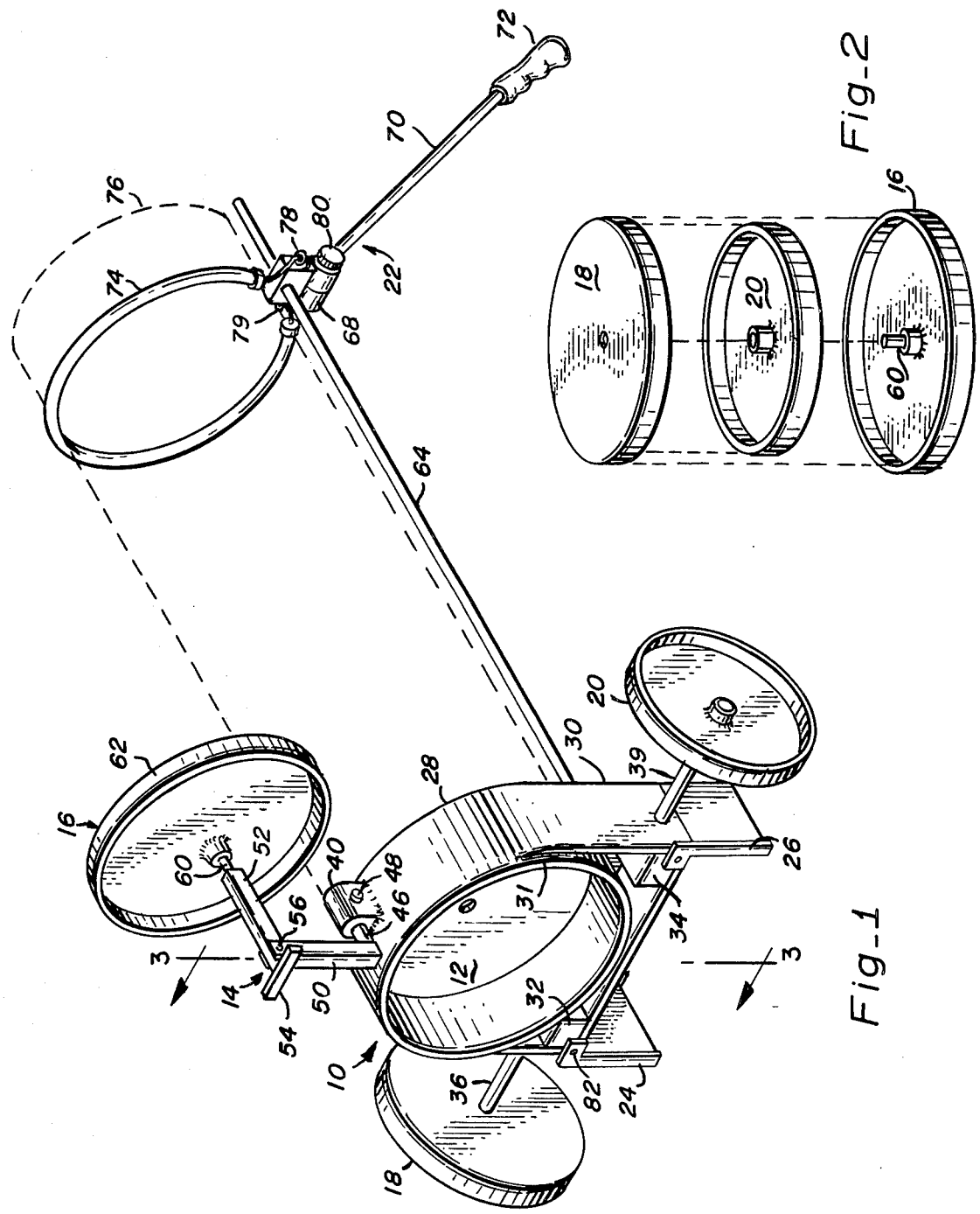
Fig_1
Fig_2

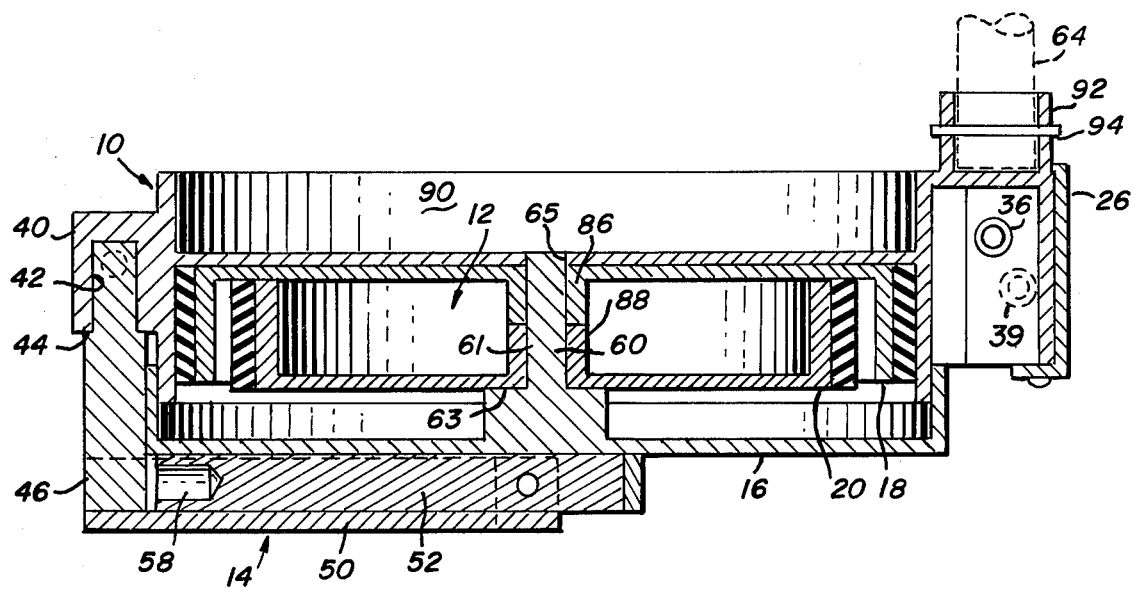
Fig_3
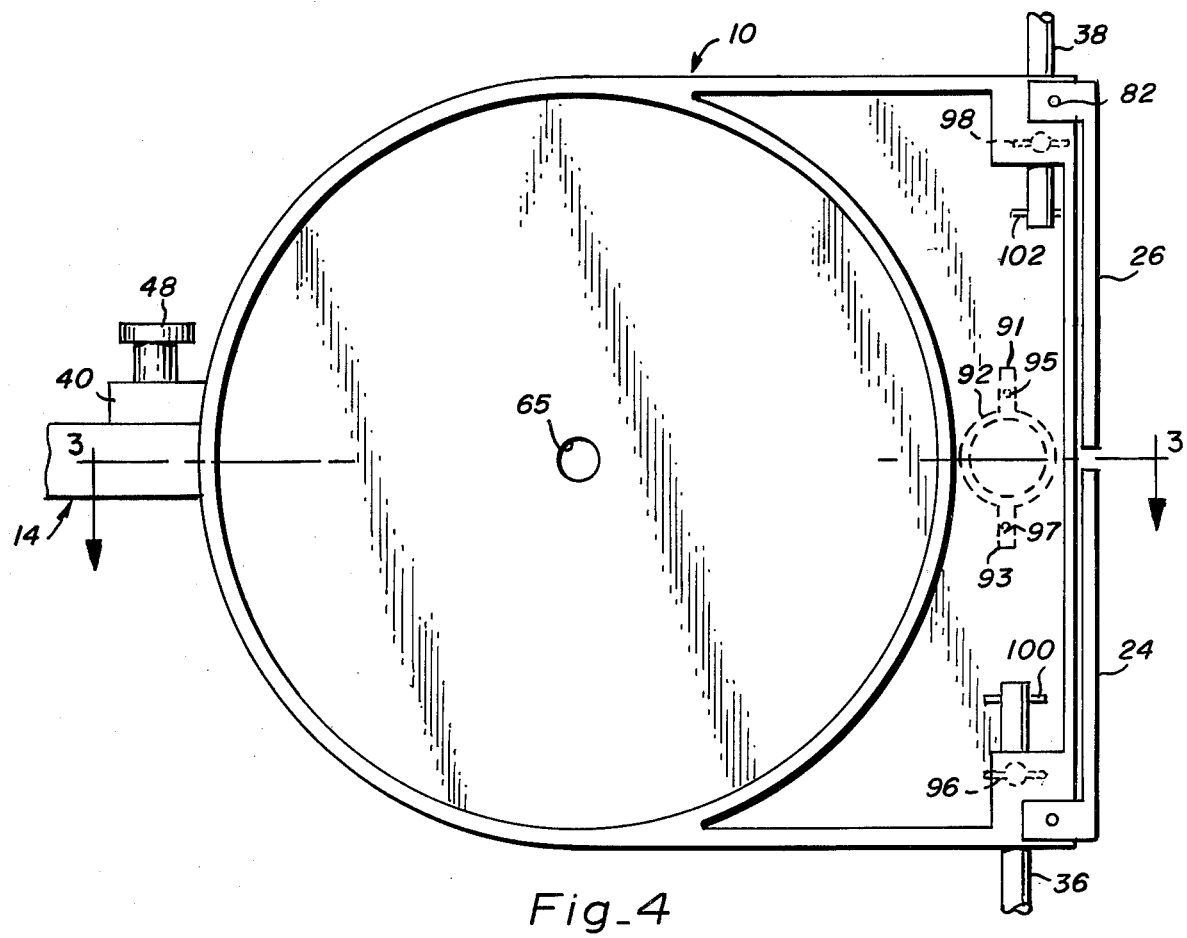
Fig_4

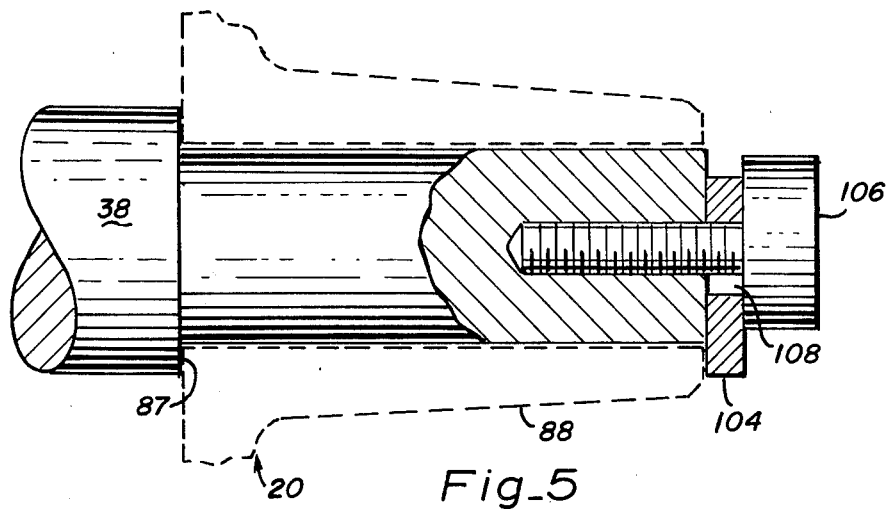
Fig_5
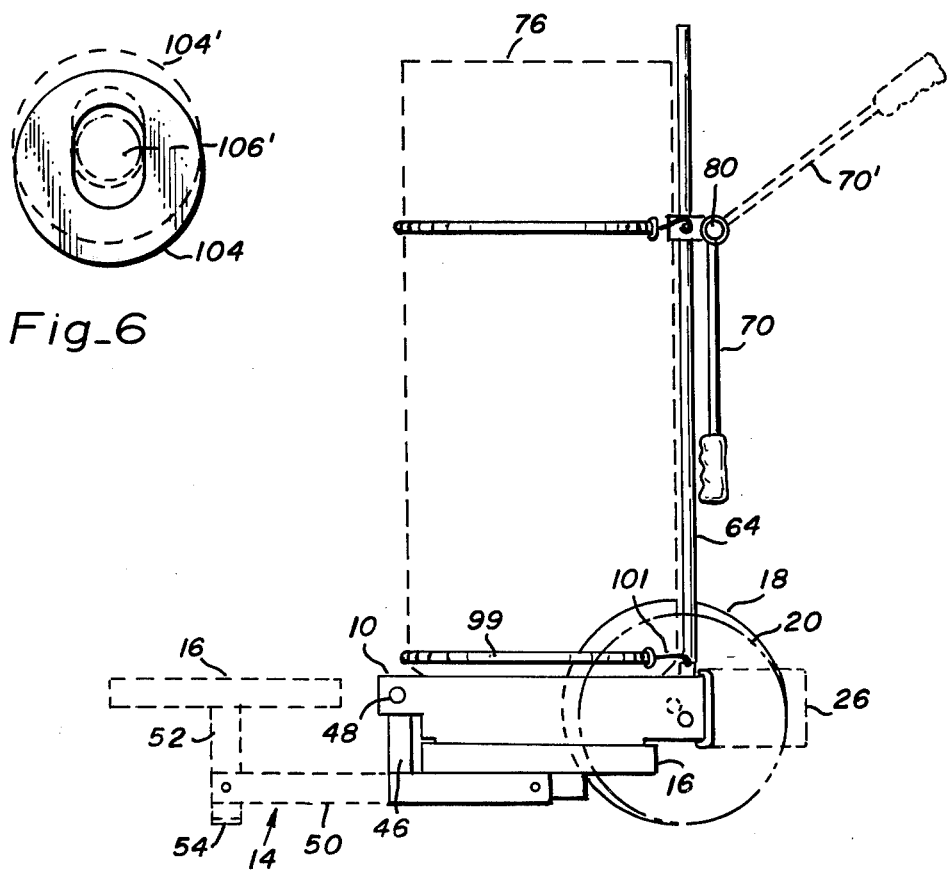
Fig_6
Fig_7

COLLAPSIBLE GOLF CART

BACKGROUND OF THE INVENTION

1. Field of the Invention

The present invention relates generally to wheeled carriages and more particularly to a collapsible cart for carrying a golf bag.

2. Description of the Prior Art

Although collapsible golf carts are well known in the prior art and various versions of such devices have been used for a number of years, most such devices share the disadvantage of bulkiness resulting from the fact that in the retracted position, the wheels are positioned alongside the carried golf bag. This bulkiness occupies substantial space, limits the number of bag/cart assemblies that can be transported in the trunk of a car, and makes the loading and unloading of the assembly difficult.

SUMMARY OF THE PRESENT INVENTION

It is therefore an objective of the present invention to provide a novel, collapsible golf cart which is compact and easy to transport and store.

Another objective of the present invention is to provide a collapsible golf cart having wheels that nest when in the collapsed configuration yet are widely spaced apart for stability when in the extended configuration.

Briefly, the preferred embodiment of the present invention includes a base having a bag receiving recess formed in its upper surface and a wheel storage recess formed in its lower surface, a pair of axles retractably extending from opposite sides of the base, a pair of wheels for attachment to the axles but adapted to be received within the storage recess when detached from the axles, a cover for the storage recess, a bracket pivotally attached to the base for holding the cover in place over the storage recess and for alternatively forming a support for the cover in another location to provide a seat, and a collapsible handle attached to the base. The base may also include a pair of foldable legs for assisting in the assembly of the cart.

An important advantage of the present invention is that it provides a golf cart which when in use differs very little in appearance, manner of use, or performance as compared to the standard golf cart, yet when collapsed, is substantially more compact than the standard cart.

These and other objectives and advantages of the present invention will no doubt become apparent to those skilled in the art after reading the following detailed description of the preferred embodiment which is illustrated in the several figures of the drawing.

IN THE DRAWING

FIG. 1 is a perspective view showing a collapsible golf cart in accordance with the present invention;

FIG. 2 is an exploded perspective view illustrating the wheels and the cover included in the embodiment of FIG. 1;

FIG. 3 is a cross section taken along the line 3—3 of FIG. 4 showing the wheels nested in the base and the cover in place;

FIG. 4 is a bottom view further illustrating the base of the embodiment shown in FIG. 1;

FIG. 5 is a partially broken side view illustrating the wheel fastening mechanism of the embodiment shown in FIG. 1;

FIG. 6 is an end view further illustrating the slotted washer shown in FIG. 5; and FIG. 7 is a side elevation further illustrating the embodiment shown in FIG. 1.

DETAILED DESCRIPTION OF THE PREFERRED EMBODIMENT

Referring now to the drawing, a collapsible golf cart in accordance with the present invention is illustrated in FIG. 1. The cart includes a base 10, a wheel storage compartment 12, a bracket assembly 14, a cover 16, a pair of wheels 18 and 20, a folding handle assembly 22, and a pair of folding assembly legs 24 and 26.

The base 10 is comprised of a cylindrical section 28 and a rectangular section 30 disposed forward of the cylindrical section and joined at a circumference. The cylindrical section 28 extends below the rectangular section 30 to provide a circular lip 31 for mating with the cover 16. The cylindrical section 28 has a cylindrical recess 12 in its lower portion of a size adapted to receive and store the wheels 18 and 20. The rectangular portion of the base 30 contains two rectangularly shaped reinforced sections 32 and 34 formed in the inside front corners of the rectangular base section to provide support for the axle 36 and 39.

A cylindrical protrusion 40 is formed in the back of the cylindrical base section 28 to provide a mount for the bracket assembly 14. Bracket mount 40 has a hole 42 extending vertically into its bottom side to permit insertion of the stepped end 44 of the rod 46 of bracket assembly 14 therein as can be seen in FIG. 3. The rod 46 is secured in either of two positions by a detent 48.

Bracket assembly 14 consists of a rod 46, a channel shaped member 50, a bar 52, and a foot 54. The rod 46 is pivotally secured at one end to the mount 40. The opposite end of the rod 46 is perpendicularly affixed to one end of the channel 50. The other end of channel 50 has protruding side portions which overlap the bar 52 near one end thereof and are pivotally attached thereto by the pin 56. Channel 50 has its open side facing upward to permit the longer end of bar 52 to be rotated into and to be received by the channel. The shorter end of the bar is perpendicularly attached to the center of a flat plate or shoe 54. A hole extends axially into the longer end of the bar 58 (as shown in FIG. 3), to receive a pin 60 mounted in the center of the cover 16. The cover 16 is disk shaped with edges 62 rolled to form an annulus of such diameter as to fit over the bottom cylindrical section of the base 28. The bracket assembly 14 is shown in the extended position where it provides a support for the seat forming cover 16.

The wheels 18 and 20 are mounted on a pair of axles 36 and 39 which extend from opposite sides of the rectangular base section 30. The wheels are also disk shaped and of different diameters, i.e., wheel 18 is of larger diameter than wheel 20, so that one can nest within the other. The axles are offset relative to each other, with axle 36 being positioned higher and rearward of axle 39. The axle offset is to permit their full length retraction into the rectangular base section 30. This permits the use of relatively long axles so as to provide good cart stability. Axle 36, which is adapted to receive the larger wheel 20, is positioned above and rearward of axle 39, to compensate for the different wheel diameters.

The handle assembly 22 includes a handle support tube 64, a clamp 68, a handle 70, a grip 72, and a bag mounting strap 74. The handle support tube 64 is attached at one end to the center of the front base section 30, and is disposed perpendicular thereto. A clamp 68 is attached to the handle support tube 64 near its other end and has two loops 78 and 79, through which hooks on the ends of an elastic tie down band 74 may be hooked to secure the golf bag 76 against the handle support tube 64. A tubular handle 70 with a rubber grip 72 formed over its upper end is rotatably attached at its lower end to the clamp 68 by a thumb screw 80. The thumb screw may be loosened to position the handle, then tightened to secure the handle in position.

The two optional front assembly legs 24 and 26 are comprised of channels having protruding side tabs at one end which overlap and are pivotally attached to the top and the bottom corners of the front rectangular base section 30 by suitable pins 82. The legs 24 and 26 are of such length as to lift the cart base off of the ground sufficient to clear the wheels 18 and 20 when the cart is tipped forwards as is shown in FIG. 1. This facilitates the assembling and disassembling of the cart.

FIG. 2 illustrates how the wheels are nested for storage. The larger wheel 18 fits over the smaller wheel 20 and is aligned by the pin 60 in the center of the cover 16.

The wheels are shown nested for storage within the base in FIG. 3. The larger wheel 18 fits over the smaller wheel 20 and is aligned and supported by the pin 60 that is formed in the center of the cover 16. The pin 60 is stepped. The smaller step 61 of the pin 60 is of such diameter as to fit inside the hubs 88 and 86 of the wheels 20 and 18, respectively. The shoulder 63 between the smaller and the larger diameter of the pin 60 supports the wheel hub 88 of the smaller wheel 20. The smaller step 61 of the pin 60 extends through the hubs to mate with a bore 65, in the center of the storage recess 12, to align and secure the wheels for storage.

In FIG. 3 the bracket assembly 14 is shown in the folded position supporting the cover 16 and the wheels 18 and 20 which are nested within the storage compartment 12. In this position the bar 52 is rotated into and received by the channel 50 which is rotated into a position beneath and in supporting relationship with the cover 16. The bracket assembly is secured in this position by the detent 48 (shown in FIG. 1).

The top of base 10 has a second cylindrical recess 90 formed therein and which is of a size adapted to receive and support the base of a golf bag. A sleeve 92, for supporting the handle support tube 64, shown in dashed lines, is also formed in the top of the front base section. The tube is secured to sleeve 92 by a spring pin 94 which passes through apertures therein. The axes of axles 36 and 38 are laterally offset in both vertical and horizontal directions within the base 10 to permit them to retract the full width of the base for storage.

Referring now to FIG. 4, two thumb screws 96 and 98, shown in dashed lines, are tapped into the front section of the base 10 from the top and are aligned to engage the axles 36 and 38, respectively, to secure the axles in either the retracted or the extended position as may be desired. Two spring pins 100 and 102 are inserted in the ends of the axles 36 and 38, respectively, to act as stops which prevent the axles from being fully withdrawn from the base.

The sleeve 92, for mounting the tube 64 and handle assembly, is shown in dashed lines. Attached to the sides of the sleeve 92 are two ears 91 and 93. The ears 91 and 93 have holes 95 and 97 respectively, formed therein of a size suited to receive the hooks 101 of a bag mounting band or strap 99 (shown in FIG. 7).

The optional front assembly legs 24 and 26 can be seen in FIGS. 3 and 4 in their stowed position folded against the front of the base 10. The detent 48 is shown in the bracket assembly mount 40 securing the bracket assembly 14 in the position projecting away from the base 10, to provide a support for the cover 16, when used as a seat as shown in FIG. 1.

FIG. 5 illustrates the wheel mounting details. The axle 38 is stepped to provide a shoulder 87 for positioning the wheel hub 88 of the wheel 20 on the axle. The wheel is retained on the axle by a washer 104 and a thumb screw 106 which is threaded into the end of the axle. The washer 104 contains a slot 108 permitting it to drop on the thumb screw 106 to provide a lip to retain the wheel hub 88 on the axle 38. The diameter of the washer 104 and the thumb screw 106 is equal to or less than the inside diameter of the hub 88 so that the wheel can be removed by loosening the screw and lifting the washer 104 to align it with the axle 38 and then sliding the wheel 20 thereover.

FIG. 6 shows an end view of the washer 104 as mounted on the thumb screw shown by dashed lines 106'. The solid line represents the washer as it normally rests on the thumb screw 106 holding the wheel in place. The washer is shown by the dashed lines 104' in position as it appears when raised to remove the wheel from the axle.

In FIG. 7, the cart is shown as it appears when folded for storage. The handle 70 is folded against the handle support tube 64 and is secured in place by the thumb screw 80. The wheels 18 and 20 are removed from the axles, nested together, and stored in the base 10. The assembly legs 26 are folded into place against the body 10.

The cover 16 and the bracket assembly 14 are shown in dashed lines in the alternative position where they function as a seat. In this position the rod 46 is secured by the detent 48 to project the channel 50 away from the base 10. The bar 54 is unfolded with the foot 54 resting against the ground and the bar extending vertically therefrom to support the cover 16 to be used as a seat. For storage, the bar 52 is rotated into the channel 50 which is then itself rotated into position beneath the base 10 so as to support the cover 16 in place over the storage compartment.

When the golf cart is collapsed the golf bag and the cart are little larger than the golf bag alone. Yet when unfolded the cart differs little in appearance or performance from that of an ordinary golf cart.

Although it is contemplated that after having read the preceding disclosure certain alterations and modifications of the present invention will no doubt become apparent to those skilled in the art, it is intended that the following claims be interpreted to cover all such alterations and modifications as fall within the true spirit and scope of the invention.

What is claimed is:

1. A collapsible golf cart comprising:
   first and second removably mounted wheels;
   a base member having a front portion and a rear portion, the rearward part of said back portion being rounded to generally conform to the base of a golf bag and having a bag supporting upper surface and a lower surface forming a recess of suitable dimensions for receiving said wheels, said front portion having a first axle receiving bore extending into one side thereof and a second axle receiving bore extending into the other side thereof;

means for retaining said wheels in said recess when they are received therewithin;

handle forming means affixed to said front portion; and first and second shafts respectively disposed in said first and second bores, each said shaft being movable between a retracted position and an extended position, the distal ends of each said shaft being adapted to receive one of said wheels, whereby when said cart is in its collapsed configuration said wheels are disposed within said recess and said shafts are in their retracted positions, and when said cart is in its operative configuration said shafts are in their extended positions and said wheels are respectively mounted to the distal ends thereof.

2. A collapsible golf cart as recited in claim 1 wherein said means for retaining said wheels includes a closure member having a flat exterior surface on one side and a first coupling element on the other side and a bracket pivotally attached to said rear portion, said bracket being pivotable between a first position wherein it holds said closure member in closing relationship with said recess and a second position, said bracket including an elongated seat support member which is rotatable between an open position and a closed position, said support member having one end adapted to form a ground engaging foot and the other end adapted to form a second coupling element, whereby when said bracket is in said second position said closure member may be affixed thereto by mating said first and second coupling elements so that said flat surface forms a seat.

3. A collapsible golf cart as recited in claim 1 wherein said handle forming means includes an elongated rod having one end affixed to said front portion and another end extending vertically upward relative thereto, and an elongated handle member having a first end pivotally attached to said other end and rotatable between a first position generally parallel to said rod and a second position intersecting said rod at an obtuse angle.

4. A collapsible golf cart as recited in claim 1 wherein said first wheel has a smaller diameter than said second wheel and said second wheel has a circular recess formed in one side thereof with a diameter large enough to receive said first wheel when said wheels are disposed within the recess in said base member.

5. A collapsible golf cart as recited in claim 4 wherein said first and second bores are disposed parallel to each other but are vertically offset relative to each other by a distance of one-half the difference of the diameter of said first and second wheels so that when said wheels are mounted to said axles said wheels support said body in a manner such that said axles are disposed parallel to the ground surface.

6. A collapsible golf cart as recited in claim 1 and further including a pair of elongated assembly support members each having one end pivotally attached to said front portion, said support members being rotatable between a folded position lying along the front of said base member and a supporting position extending outwardly relative to the front of said base member such that when said base is rotated forwardly said support members cause said base member to be raised above the ground a distance slightly larger than one-half the diameter of said wheels.

* * * * *